No. 750,281. PATENTED JAN. 26, 1904.
T. H. HICKS.
ORE CONCENTRATOR.
APPLICATION FILED MAR. 8, 1902.
NO MODEL. 3 SHEETS—SHEET 1.

WITNESSES:
Emma Pope
Selma Luhman

Thomas H. Hicks INVENTOR.
BY H. G. Burns
ATTORNEY.

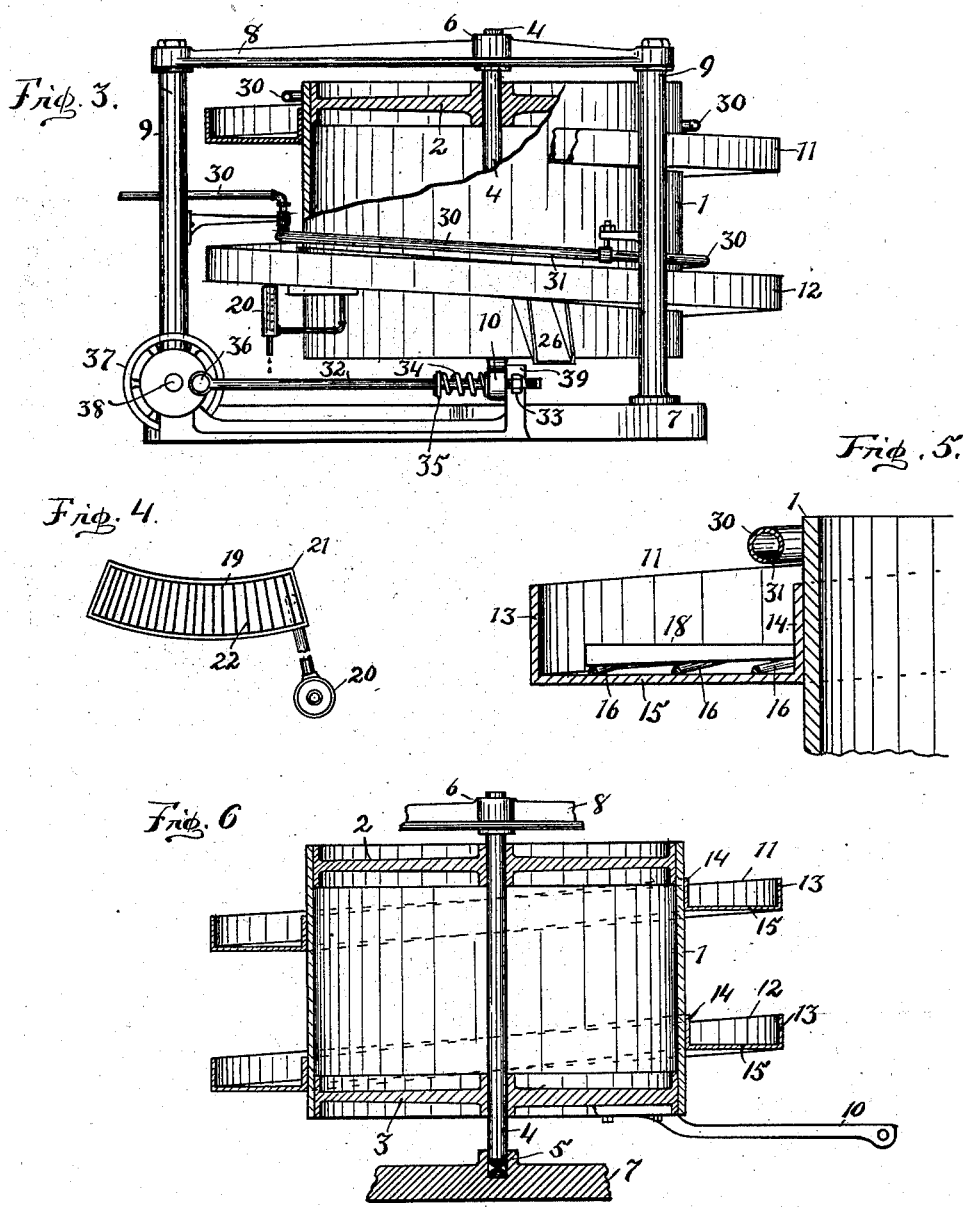

No. 750,281. PATENTED JAN. 26, 1904.
T. H. HICKS.
ORE CONCENTRATOR.
APPLICATION FILED MAR. 8, 1902.
NO MODEL. 3 SHEETS—SHEET 3.

Thomas H Hicks INVENTOR

WITNESSES:

BY

ATTORNEY

No. 750,281. Patented January 26, 1904.

UNITED STATES PATENT OFFICE.

THOMAS H. HICKS, OF FORT WAYNE, INDIANA, ASSIGNOR TO THE HICKS GOLD AND SILVER EXTRACTION COMPANY, A CORPORATION OF GEORGIA.

ORE-CONCENTRATOR.

SPECIFICATION forming part of Letters Patent No. 750,281, dated January 26, 1904.

Application filed March 8, 1902. Serial No. 97,236. (No model.)

*To all whom it may concern:*

Be it known that I, THOMAS H. HICKS, a subject of the King of Great Britain, residing at Fort Wayne, in the county of Allen and State of Indiana, have invented certain new and useful Improvements in Ore-Concentrators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in ore-concentrators; and the object of my improvements is to afford means to recover floured mercury from ore which has been previously treated by amalgamation and to separate from pulverized ore the sulfids therein contained.

I attain my object by the construction illustrated by the accompanying drawings, in which—

Figure 1:
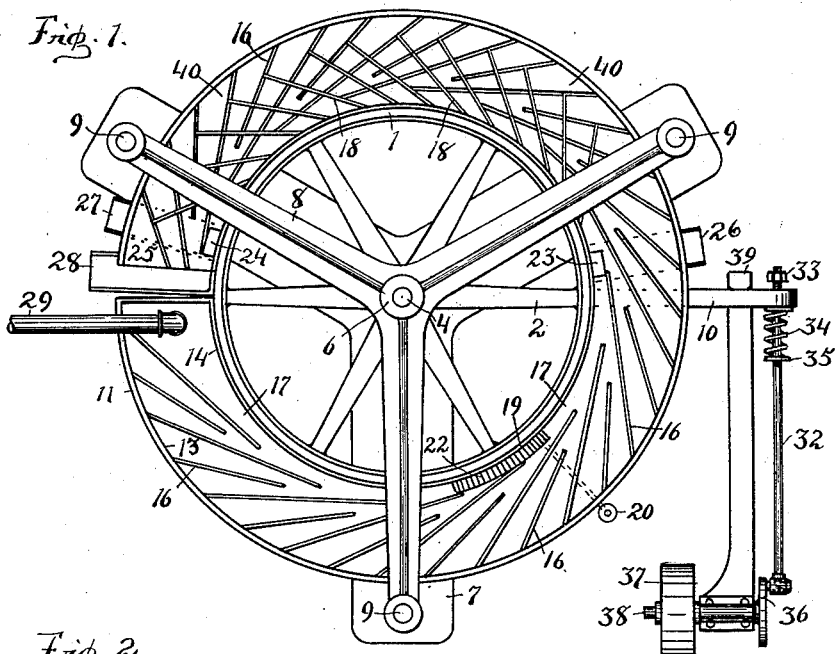
Figure 2:
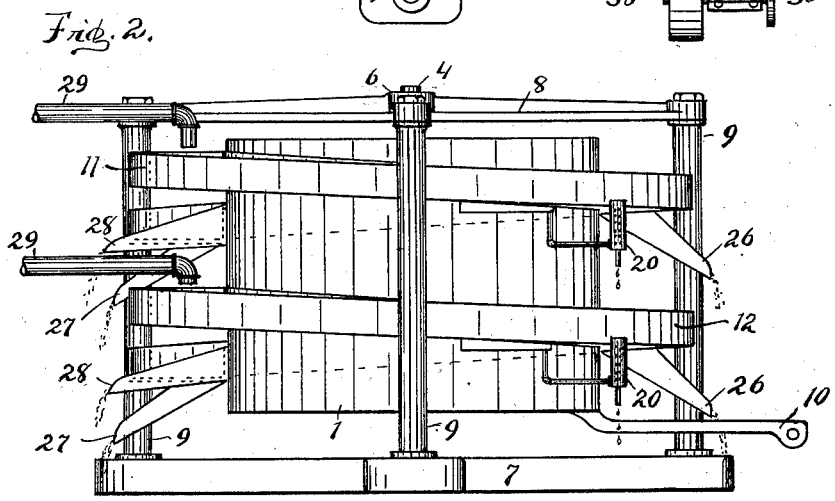
Figure 7:
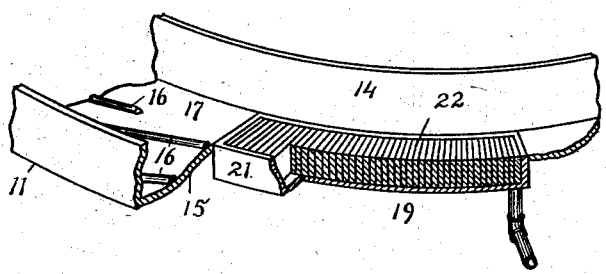

Figure 1 is a plan. Fig. 2 is a side elevation. Fig. 3 is an elevation in a plane at right angles to that of Fig. 2 and is shown partly broken away. Fig. 4 is a plan of the mercury collector and trap. Fig. 5 is a detail, on an enlarged scale, showing a transverse section through one of the concentrating-troughs. Fig. 6 is a vertical section through the cylinder and troughs, and Fig. 7 is a detail in perspective showing a section through the mercury-collector.

Similar numerals of reference indicate corresponding parts throughout the several views.

1 is a cylinder mounted upon spiders 2 and 3, which are rigidly fixed upon a vertical rotatively-oscillating shaft 4. The said shaft is mounted in suitable bearings 5 and 6, the former of which is in the base 7 of the machine and the latter in a frame-casting 8, which is supported above the cylinder 1 upon posts 9.

10 is a lever rigidly secured to the cylinder 1.

11 and 12 are spirally-descending concentrating-troughs composed of outer walls 13, inner walls 14, and bottoms 15, and are secured rigidly upon the cylinder 1. Upon the bottom of each trough is arranged a series of riffles 16, which extend diagonally from the outer wall 13 and converge toward the inner wall 14, leaving a passage-way 17 for concentrates without riffles extending along the bottom contiguous to the inner wall.

18 is a series of diverting-blades arranged upon the tops of the riffles 16, which blades diverge from the inner wall 14 and extend to points a short distance from the outer wall, thereby leaving a passage-way 40 for ore-tailings along the outer wall over the tops of the riffles 16.

19 is a mercury-collector arranged in the passage-way 17 in the bottom of the trough and has connected therewith a trap 20 for draining off collected mercury. The mercury-collector 19 is composed of a receptacle 21, filled with amalgamated strips of metal 22.

Each trough has an outlet-opening 23 for the passage of sulfids, which opening is in the passage-way 17 and extends through the bottom of the trough. Another opening 24 for the passage of middlings is similarly arranged near the outlet ends 25 of the troughs. A chute 26 is arranged beneath the opening 23 for the discharge of sulfids, and a chute 27 is arranged beneath the opening 24 for the discharge of middlings. A chute 28 is also arranged at the outlet ends 25 of the troughs for the discharge of ore-tailings. A feed-pipe 29 is arranged to convey ore and water into the inlet end of the trough. A water-pipe 30 (shown in Figs. 3 and 5) is arranged above the trough near its inner wall, which pipe has apertures 31 for supplying water to wash the concentrates.

A pitman 32 extends through the end of the lever 10 and has a stop-nut 33 on its end. A spring 34 is arranged around the pitman, and a collar 35 is fixed upon said pitman to hold said spring against said lever. The other end of the pitman is mounted upon a crank 36, which is adapted to be driven by the pulley 37, connected therewith by a shaft 38. A rigid stop 39 is arranged in the path of the lever 10, against which said lever is adapted to strike repeatedly when driven by the pitman 32.

In the operation of my invention the concentrator is set in horizontal rotatively-oscillating motion by any suitable source of power, as by the pitman 32. The stop-nut 33 is adjusted upon the pitman so as to cause the lever 10 to strike against the stop 39, thereby suddenly stopping the forward movements of the machine, which produces a differential shaking movement of the troughs. A suitable mixture of ore and water is fed into the upper or inlet end of the trough. Also water is fed through the pipe 30. The spiral descent of the trough causes the ore and water to tend toward its outer wall, and as the ore flows along the trough its sulfids and floured mercury become settled upon the bottom. The oscillating differential motion of the machine and the riffles 16, arranged as described, cause the settled sulfids and floured mercury, together with any portion of settled ore gangue, to move toward the passage-way 17, and as the settled portions of the ore approach the converging ends of the riffles they become congested and the heavier portions thereby lift the lighter and valueless part thereof above the riffles, over which they are again carried toward the outer wall of the trough by the water supplied by the pipe 30 and assisted by the diverting-blades 18. As the ore is washed outward over the riffles any values contained therein are caught by the succeeding riffles 16 and again carried inward to the passage-way 17. I have shown the diverting-blades 18 extending over only a portion of the length of the trough, some of the series being omitted for the sake of presenting a clearer view of the series of riffles 16.

Although I show means to impart a differential motion to the troughs, still I wish it understood that my machine is operative even though the motion is regular instead of differential, the descent of the trough being sufficient to cause the ore to move down through the trough when evenly shaken, but of course not so rapidly as when a differential motion is used.

By reason of greater specific gravity the floured mercury settles beneath the sulfids in moving along the trough, and as the same passes over the amalgamated strips 22 of the mercury-collector 19 the floured mercury coalesces and gravitates between said strips and flows out into the trap 20, from which it may be saved in any suitable manner.

The separated sulfids pass over the tops of the amalgamated strips and continue along the passage-way 17 and are discharged through the opening 23 and chute 26. Whatever sulfids are carried with the ore gangue beyond the opening 23 are subsequently recovered as middlings through the opening 24 and chute 27 and are intended to be returned through the trough for further concentration. The tailings pass from the outlet end of the trough and are discharged through the chute 28.

Having described my invention, what I claim as new, and desire to secure by Letters Patent, is—

1. In an ore-concentrator, a spirally-descending concentrating-trough; a series of riffles 16 arranged diagonally upon the bottom of said trough and converging toward the inner wall thereof; and means to differentially oscillate the trough.

2. In an ore-concentrator, a spirally-descending concentrating-trough having a series of riffles arranged diagonally upon its bottom and converging toward the inner wall thereof; a series of diverting-blades 18 arranged upon the tops of said riffles and diverging from said inner wall; and means to oscillate the trough.

3. In an ore-concentrator, a spirally-descending concentrating-trough; a passage-way 17 for concentrates along the inner wall of said trough; a series of riffles arranged diagonally upon the bottom of the trough and converging toward said passage-way; and means to differentially oscillate the trough.

4. In an ore-concentrator, a spirally-descending concentrating-trough; a passage-way 17 for concentrates along the inner wall of the trough; a series of riffles 16 arranged diagonally upon the bottom of the trough and converging toward said passage-way; a series of diverting-blades 18 arranged upon the tops of said riffles, diverging from the inner wall of said trough and extending to points near the outer wall thereof, thereby leaving a passage-way 40 for ore-tailings along said outer wall; and means to differentially oscillate the trough.

5. In an ore-concentrator, a vertical series of spirally-descending concentrating-troughs mounted to oscillate upon a common center; a series of riffles arranged diagonally upon the bottom of each trough; and means to differentially oscillate the series of troughs.

6. In an ore-concentrator, a spirally-descending concentrating-trough having an inner wall 14, and mounted to oscillate upon its center; a passage-way 17 for concentrates in the bottom of the trough along said inner wall; a series of riffles 16 arranged diagonally upon the bottom of said trough and converging toward the inner wall thereof; a stationary water-pipe 30 located along said inner wall and arranged to discharge water into said passage-way to wash the concentrates therein; and means to oscillate the trough.

In testimony whereof I affix my signature in presence of two witnesses.

THOMAS H. HICKS.

Witnesses:
M. J. BLITZ,
W. G. BURNS.